United States Patent [19]

Hogue

[11] Patent Number: 5,009,032
[45] Date of Patent: Apr. 23, 1991

[54] PORTABLE AUTOMATIC WATER-RELEASING PLANT RECEPTACLE

[75] Inventor: Etheridge C. Hogue, 198 Pine Street, SW., Bessemer, Ala. 35020

[73] Assignee: Etheridge C. Hogue, Birmingham, Ala.

[21] Appl. No.: 264,994

[22] Filed: Oct. 31, 1988

[51] Int. Cl.⁵ ............ A01G 25/00; A01G 29/00
[52] U.S. Cl. ............................... 47/79; 47/48.5
[58] Field of Search ............. 47/27, 40.5, 48.5, 62, 47/82, 79, 67, 59

[56] References Cited

U.S. PATENT DOCUMENTS

| | | | |
|---|---|---|---|
| 927,245 | 7/1909 | Jackson | 47/79 |
| 2,198,309 | 4/1940 | James | 47/79 |
| 3,168,224 | 2/1965 | Rios | 47/79 |
| 3,168,797 | 2/1965 | Patassy | 47/79 |
| 3,754,527 | 8/1973 | Jenkins | 47/79 |
| 3,906,667 | 9/1975 | Williams | 47/79 |
| 4,060,934 | 12/1977 | Skaggs | 47/79 |
| 4,157,770 | 6/1979 | Roos | 47/79 |
| 4,760,666 | 8/1988 | Han | 47/67 |
| 4,829,708 | 5/1989 | Gonzalez | 47/79 |

FOREIGN PATENT DOCUMENTS

| | | | |
|---|---|---|---|
| 2820540 | 11/1979 | Fed. Rep. of Germany | 47/59 |
| 2452874 | 12/1980 | France | 47/59 |

Primary Examiner—Robert A. Hafer
Assistant Examiner—Kerry Owens

[57] ABSTRACT

The present invention is, in simple terms, a self-watering flower pot; it comprises a water storage tank which is made up of a dual-chambered hydraulic system, an elastic water container and a chamber which accumulates and releases the tank's water into an integrally attached planter portion. The present invention stores a sufficient amount of water, poured into its tank, and releases the water periodically into its planter portion, without the use of electrical or chemical power sources and the frequency of water release may be determined by the user. The present invention is energized as a result of water poured into its storage tank and that energy will be proportional to the amount of water in the tank. The present invention is portable, lightweight, intended to weigh approximately five pounds and be made of plastic, but may be made of any rigid material(s), of any density(s) that will allow proper operation.

8 Claims, 5 Drawing Sheets

PORTABLE AUTOMATIC WATER-RELEASING PLANT RECEPTACLE

FIELD OF THE INVENTION

The present invention belongs to the field of art referred to as plant receptacles and sub-classed as irrigators.

To my knowledge, irrigating plant receptacles were supplied the power to distribute and release their water by external and/or electrical/chemical pumping sources, and were bulky composites of planters, hoses and cumbersome control gadgetry. Whereas, the present invention posesses none of the above attributes, but is integrally self-contained in its entirety and is compact, portable, inexpensive, and is a household product. The power to operate the present invention is facilitated by the use of a special type of hydraulic system. To my knowledge, conventional hydraulic systems are designed to only transfer energy from chamber to chamber and are made air-tight by an extremely close proximity of their disks' outside perimeters to their cylinders' inside perimeters. Whereas, the present invention necessitated the use of a hydraulic system that reciprocates as well as transfers energy between chambers, while maintaining a constant and pristine fluid volume without excessive friction build-up due to the movement of its force transfering members. This end was achieved by utilizing a dual wheel-and-axle assembly and springs within the hydraulic chambers.

SUMMARY

For many years, house plant growers have watered their plants faithfully, and at regular intervals. If a house plant owner has to be away from his/her plants for an extended period, the owner has to either take the dependent plants along or make arrangements to have the plants watered on schedule. Either option is probably inconvenient or not feasible. The present invention eliminates this problem.

The present invention is a composite of a planter, a water storage supply, an automatic water release means, and a plant care items storage compartment all in one common structure, and never needs winding up or fuel; it gets its energy from the water poured into it. The ability, of the present invention, to extract energy from its tank water is attributed to the construction of its water storage tank.

The storage tank consists of three sections: a primary hydraulic chamber, which makes up the bottom portion of the storage tank, a water accumulation chamber, open to the atmosphere and situated in the top portion of the storage tank, and an elastic container which contains the water as poured into the storage tank. The primary hydraulic chamber communicates with a secondary hydraulic chamber and contains a primary force transferring member, supported by springs which in union with the elastic container exert a restoring force when displaced by the weight of the water poured into the elastic container (which rests atop the primary force transfering member). The accumulation chamber initiates and facilitates the water transfer from the storage tank to the planter portion.

As water is poured into the storage tank, it necessarily displaces the elastic container and consequently the springs. Under atmospheric influence, the water attempts to distribute (level) itself throughout the storage tank whereby it enters into the accumulation chamber as water seepage. The accumulation chamber is constructed such that it is open to the intrusion of the tank water through an inlet opening in its bottom, but is restrictive to the reverse seepage through that same opening. This seemingly adversive characteristic is due to the dispersion of water pressure, entering the inlet opening, onto the larger area of the bottom of the accumulation chamber.

Upon entering the accumulation chamber, the weight of the seeped water is removed from atop the force restoring components thereby, creating an imbalance of elastic restoring force over fluid weight force. This imbalance causes an upward flow of tank water which consequently reinforces the water seepage which reinforces the imbalance. When the water in the accumulation chamber reaches a certain level, that water is released by a water-releasing apparatus designed for the present invention. When the water level in the chamber is again low enough, the same water-releasing apparatus blocks the water release openings of the accumulation chamber, and allows the cycle to pepeat itself. The cycle continues until the force restoring components return to their positions before displacement.

The water-releasing apparatus consists of two buoyant floats contained within the accumulation chamber. The larger of the floats is used only to exert a vertical force on the smaller of the floats. The smaller float is embedded with a first magnet which holds the smaller float's side against the water release openings, due to the magnetic attraction of a second magnet situated outside of the accumulation chamber. The variation in high and low water levels within the accumulation chamber facilitates the automatic blocking and unblocking of the water release openings, by the breaking and attraction of the magnetic fields.

The restoring force, due to the potential energy stored in the springs and elastic container, would not be as effective in facilitating the reciprocation process, if the problem of friction, due to force transfering member movement, was not minimized. By using cables, attached to and interlocking the force transfering members, to maintain a constant and pristine fluid volume, within the hydraulic system, the force transfering members need only form fluid-tight perimeters within the chambers' inside walls.

In conclusion, the user of the present invention energizes it with power by increasing the potential energy of the water when raising the elevation of that water and pouring it into the storage tank.

DESCRIPTION OF THE INVENTION

FIGS. 1 thru 6, of the attached pages numbered (1) thru (5), illustrate the entire contents of the present invention "Portable Automatic Water-releasing Plant Receptacle."

FIG. 1, page (1) illustrates a front elevation of the present invention and shows the basic arrangement of a liquid storage. Reference number (6) shows the position of an accumulation chamber, (5) shows an elevation of an elastic water container, "8" indicates a primary force transferring member of a primary hydraulic chamber, "9" shows a possible spring arrangement within the primary hydraulic chamber (4), "10" shows the arrangement of a dual wheel-and axle assembly within the primary chamber (4), "14" shows the cross-section of a first hydraulic passage between the primary hydraulic chamber (4) and a secondary hydraulic chamber (3), "13" shows the passage for a secondary cable to connect with a secondary force transferring member of the secondary hydraulic chamber and (2) shows the location of a storage compartment disposed beneath a planter portion (1).

FIG. 2, page (2) illustrates a top view of the present invention and shows the plan views of the accumulation chamber (6), the springs "9", the dual wheel-and-axle assembly "10", hydraulic passages "13" and "14", an inner shared wall of the liquid storage tank, the secondary force transferring member "7" of the secondary hydraulic chamber, and a common wall "15" between the secondary hydraulic chamber (3) and the storage compartment (2).

FIG. 3, page (2) illustrates a right side elevation of the present invention and shows the positions of the planter portion (1), the secondary hydraulic chamber (3) and its force transferring member "7", the primary hydraulic chamber (4) and its force transferring member "8", a hollow base (11) supporting the liquid storage tank, the accumulation chamber (6), the elastic container (5), the springs "9", an opened end "16" of the storage compartment (2), and the dual wheel-and-axle assembly "10".

FIG. 4 is an isometric projection of the present invention, excluding the inner details of the accumulation chamber.

FIG. 5 is a detailed isometric projection of a water-release apparatus (17) contained within the accumulation chamber (6). Reference number "18" shows an opening, to allow the insertion of a water inlet control means, within a first buoyant float, "19" shows a second buoyant flanged-top-and-bottom float, "20" indicates a first magnet embedded in the second buoyant float "19" and "21" shows a second magnet to be placed outside of the accumulation chamber's water release openings for the purpose of attracting the first magnet.

FIG. 6, page (5) is a detailed isometric of the accumulation chamber (6), containing the water-release apparatus, omitting a water inlet control means.

DETAILED DESCRIPTION

Figure 4:
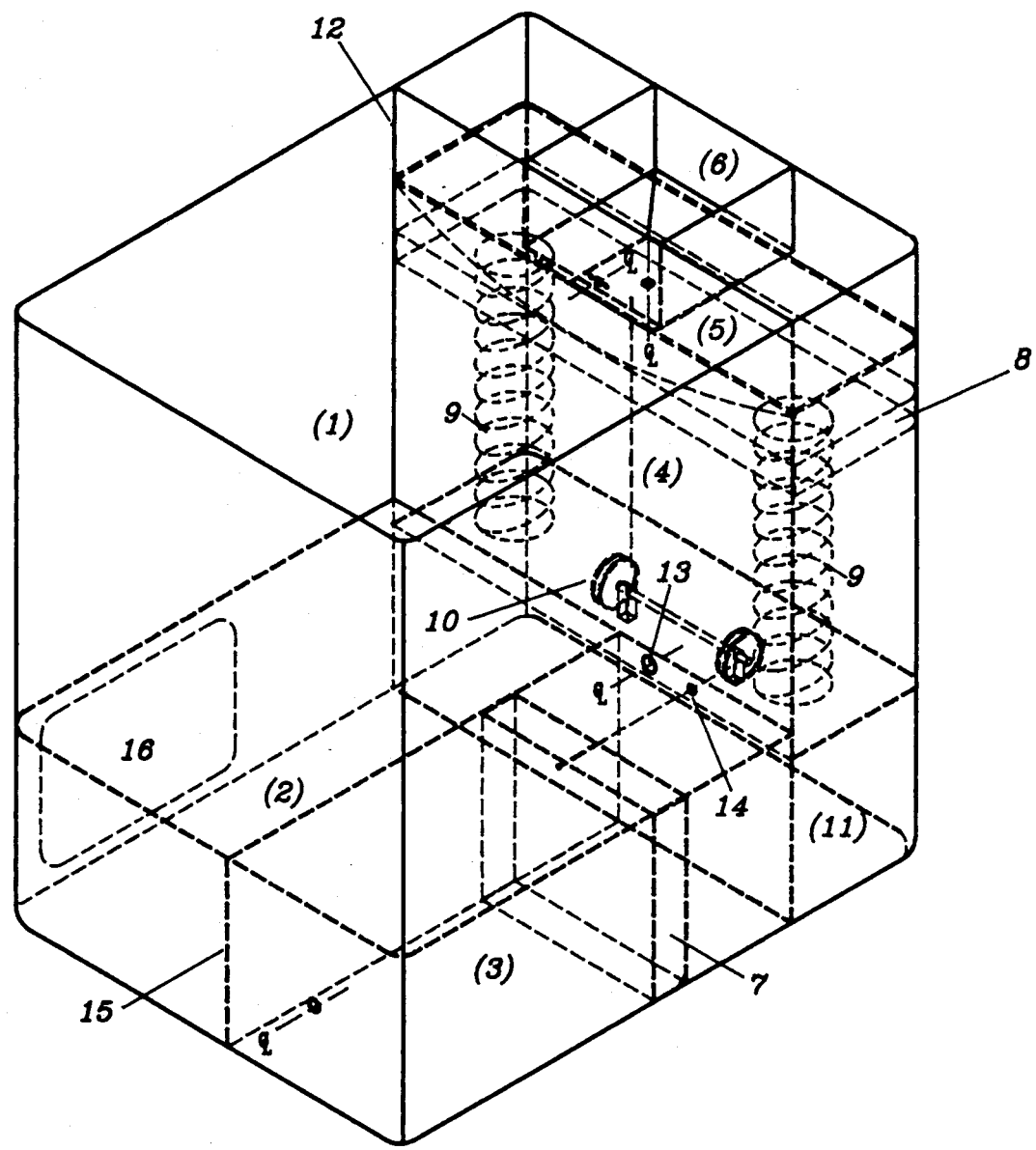
Figure 5:
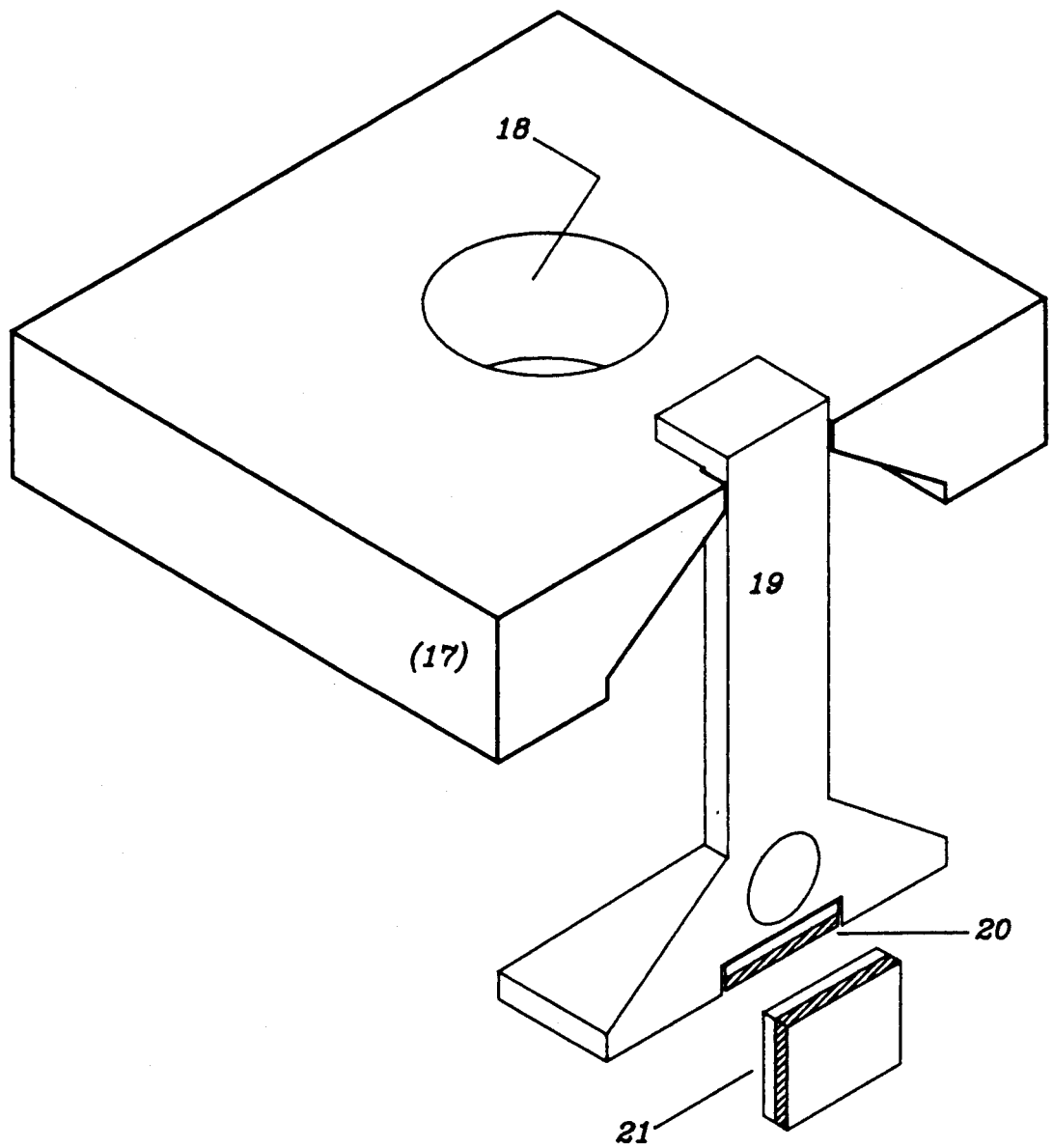
Figure 6:
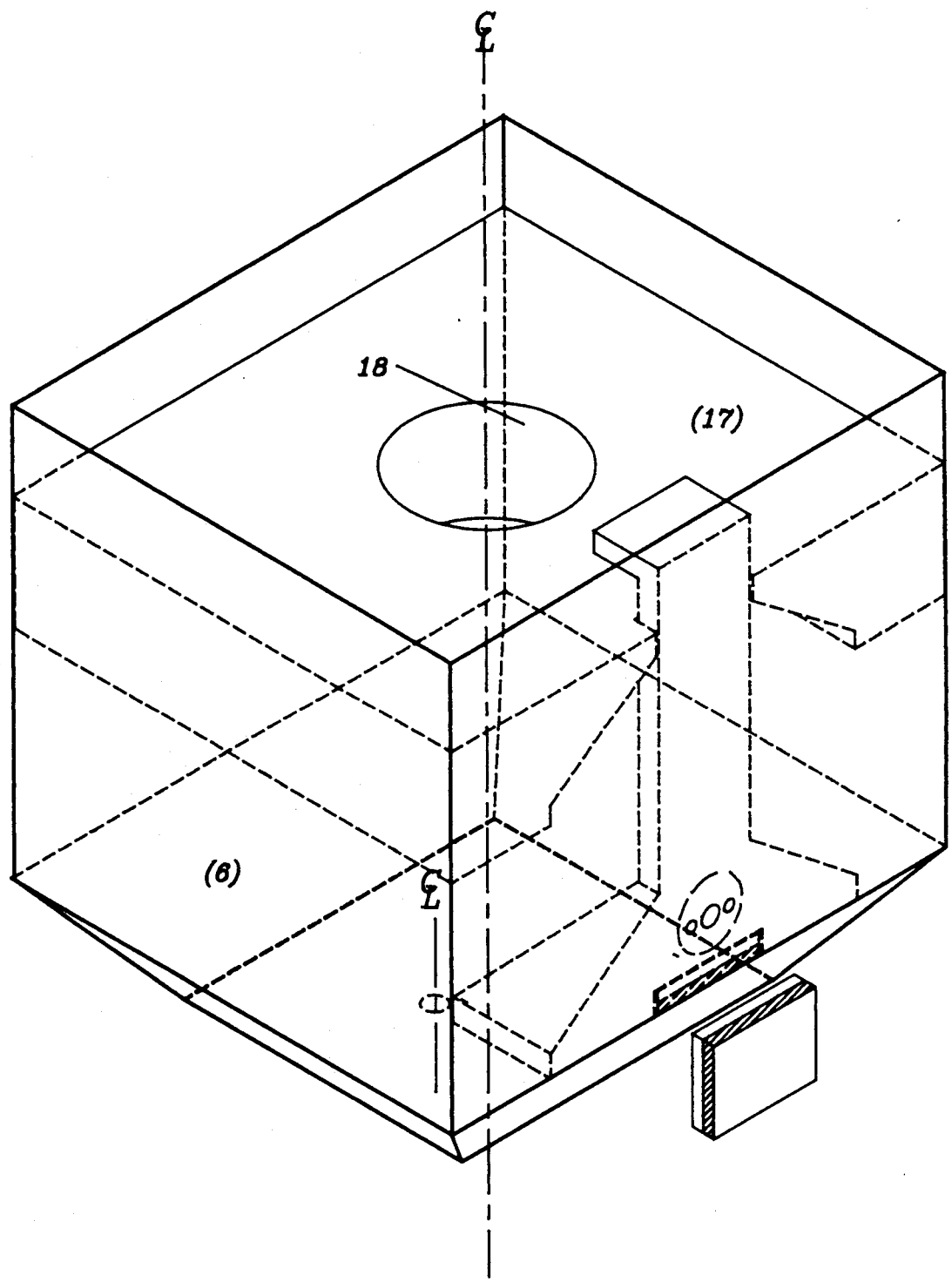

Referring to FIG. 4, one can see the complete arrangement of the present invention. The present invention is preferably made of rigid plastic, with metallic springs (piano wire) "9", and a plastic wheel-and-axle assembly "10" having non-stretchable nylon cables. The entire receptacle housing, excluding the force transferring member "7" and "8", the springs "9", the dual wheel-and-axle assembly "10", the elastic container (5), the accumulation chamber (6) and its bottom member may be fabricated, using a plastic injection mold process. The remaining components may be constructed, using a number of available methods. The method of manufacturing the present invention is not important because no new or specific technology is required; only a specific arrangement as follows:

The construction of the accumulation chamber (6) has specific purpose, and is preferably made of rigid plastic. A pyramidal shaped bottom is necessary to allow an initial accumulation of seeped water within the accumulation chamber, before that water reaches the bottom of the water-release apparatus of FIG. 5. The initial accumulation is needed to establish a buoyant force substantial enough to overcome the weight of the first rigid float "18" at rest, since the amount of energy transferred into the accumulation chamber, by the water at any instant, is very small. As can be seen from FIG. 6, the water-release apparatus is fitted within the accumulation chamber (6). The fit is close enough to prevent the tilting of the first rigid float "18", but loose enough to allow its movement with little frictional resistance. The magnets (FIG. 5, "20" and "21") are to be chosen such that their magnetic attraction is overcome by the buoyant force imposed by the first floats "18" upon the top flange of the second float "19". The floats "18" and "19" may be made of any buoyant material, as long as their buoyancy forces will overcome the force of the referrenced magnetic attraction.

Referring again to FIG. 4, the constant of the springs "9", the elasticity of the elastic container (5), the weight of the force transferring member "8" and the weight of the hydraulic fluid (preferably, inorganic) must be chose such that their combined energy transferring properties will reciprocate the weight force of the water poured into the storage tank; the poured water must displace the springs "9", the elastic container (5) and the hydraulic fluid on an inch-to-inch basis for any given tank volume. The force transferring members "7" and "8" must form fluid-tight perimeters within their respective hydrualic chambers.

The secondary hydraulic chamber (3) is made open to the atmosphere, by an opening in its rear wall. The primary hydrualic chamber (4) is not open to the atmosphere, but would be, in the event of a puncture in the elastic container (5). For this reason, the force restoring contribution of the elasticity of the container (5) should be relatively small in comparison to that of the springs "9", so that some operation of the present invention could be realized, in the event of a puncture.

The ratio of the first and second wheels of the assembly "10", FIG. 4, should be the same as that of the horizontal cross-sectional area ratio of the force transferring members "7" and "8". Because the force transferring members have different cross-sectional areas, their travel distances are going to be different for any transfer of fluid volume.

Figure 1:
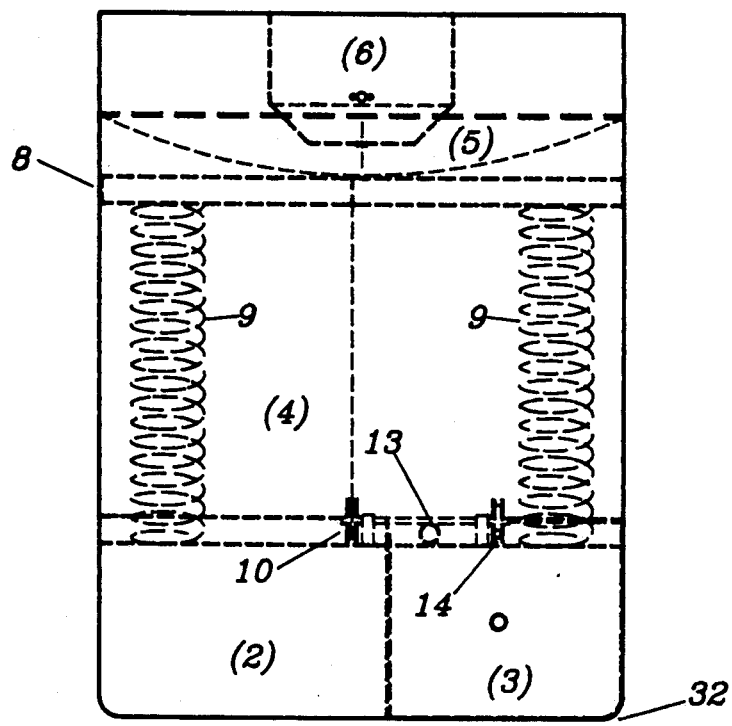
Figure 2:
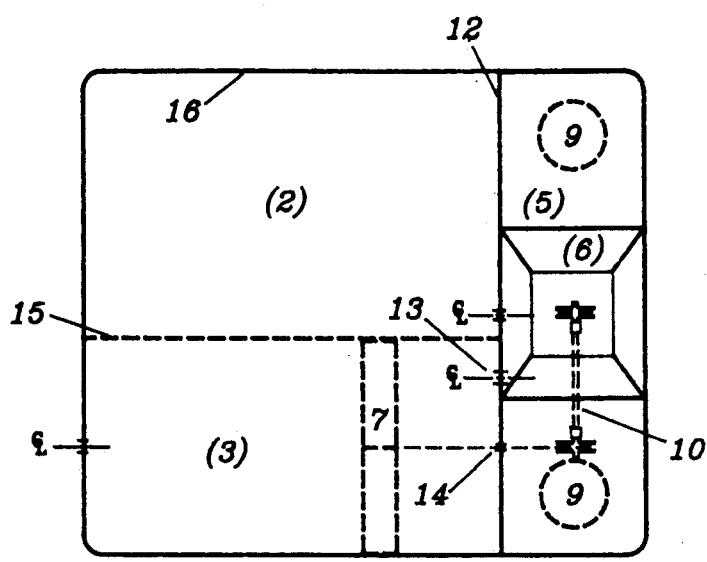
Figure 3:
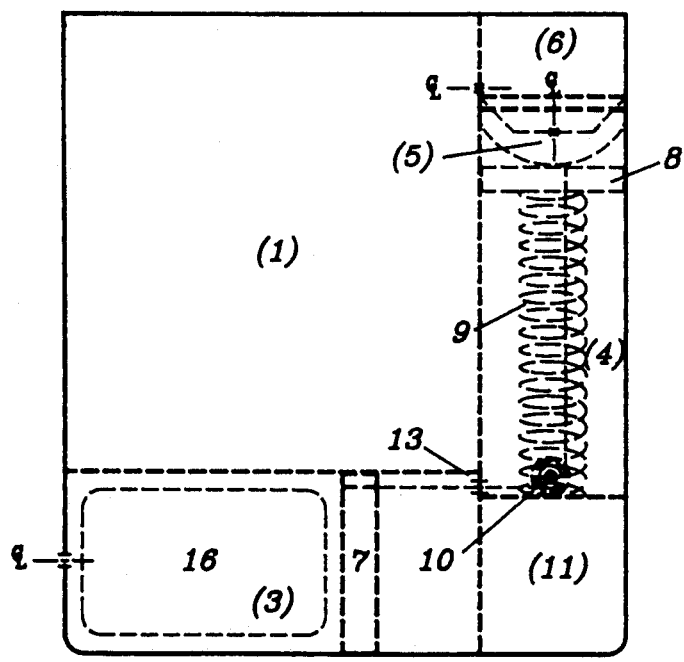

The elastic container FIG. 1, (5), may be attached to the inner walls of the storage tank by any means that does not interfere with the correct operation of the present invention, for example by a water-resistant adhesive to provide water-tightness above the primary force transferring member "8". It is desirable, however, that the elastic container rests atop the primary force transferring member, to simplify energy transfer calculations.

The volume of the accumulation chamber may vary, as long as its volume will allow the removal of enough tank water to create an imbalance of elastic restoring forces over the remaining weight forces involved.

The assembly of the present invention may be as follows:

Once the receptacle housing is formed, the dual wheel-and-axle assembly "10" should be secured to the bottom of the primary hydraulic chamber; the secondary cable should be threaded through the second passage "13" and attached to the secondary force transferring member "7", while it is at its maximum travel distance. Next the first hydraulic passage "14" should be fabricated and the receptacle's bottom member should be placed and secured. The measured amount of hydraulic fluid should be poured into the primary hydraulic chamber (4) and the secondary force transferring member pulled to its shortest travel distance. Next, the springs "9" should be placed in the primary chamber (4) and the primary cable threaded through and secured to the top of the primary force transferring member "8" as it is lowered into place atop the springs "9". Next, the elastic container (5) should be secured to the storage tank, then the portions of the accumulation chamber, not provided by the tank walls, should be installed in the tank. The water-release apparatus and a water inlet control means should be placed next and all remaining openings, etc. fabricated. An optional tank top may be utilized also and an enclosure for the storage compartment attached. Finally, a full level marker could be indicated on an inside wall of the storage tank.

Having performed all of the above, the present invention should be ready for operation. Simply, pour water into the top of the storage tank (not into the accumulation chamber), set the water inlet control rate and the present invention should do the rest.

There are various ways of indicating a full tank. Any means of achieving the above may be used, as long as it does not interfere with the proper operation of the present invention. In addition, many styles and designs of the receptacle housing may be used (for example: round, square, oblong, etc.), for aesthetic effects, as long as the design contains the particular opreational sections (1), (2), (3), (4), (5), (6) and (11) of FIG. 4, and their arrangement is as described in this detailed (preferred) embodiment.

What is claimed is:

1. A portable automatic water-releasing plant receptacle comprising a receptacle housing integrally containing;

a liquid storage tank for holding water to be delivered to a planter portion integrally attached thereto;

an accumulation chamber having an inlet opening and a plurality of release openings and situated in the top portion of said storage tank to release water into said planter portion;

a dual chamber hydraulic system wherein a primary chamber of said hydraulic system integrally makes up the bottom portion of said storage tank and a secondary chamber is situated beside a storage compartment, separated by a common wall therebetween, disposed beneath said planter portion;

a hollow base integrally supporting the bottom of said storage tank;

an elastic container attached to the inner walls of said storage tank to contain water as poured into said storage tank;

a water release apparatus contained within said accumulation chamber, and comprising a rigid float, fitted with a second buoyant flanged top-and-bottom float (embedded with a first magnet to be attracted by a second magnet situated on the outside of said accumulation chamber) for the purpose of blocking and unblocking said release openings of said accumulation chamber as the result of a buoyant force applied to and removed from said second flanged float by said rigid float as the water level in said accumulation chamber rises and falls upon water accumulation and release;

a dual wheel-and-axle assembly and a plurality of springs contained within said primary hydraulic chamber to transfer energy between said primary and said secondary hydraulic chambers; and hydraulic passages communicating between said primary chamber and said secondary chamber wherein said hydraulic passages comprise a first passage to allow fluid flow between said primary and secondary chambers therethrough and a second passage to allow movement of a secondary cable of said dual wheel-and-axle assembly therethrough.

2. The apparatus of claim 1, wherein said second magnet is positioned outside and beneath said release openings of said accumulation chamber.

3. The apparatus of claim 2, wherein said elastic container rests atop a primary force transferring member of said primary chamber, forming a water-tight seal thereabove.

4. The apparatus of claim 3, wherein said primary force transferring member is contoured to form a fluid-tight perimeter within said primary chamber and is supported by hydraulic fluid and said springs where said springs in union with said elastic container exert an upward restoring force when displaced by the weights of said primary force transferring member, said water in said storage tank and said hydraulic fluid (as it flows from said primary chamber downward into said secondary chamber).

5. The apparatus of claim 4, wherein said secondary chamber has a small opening in its rear wall and contains said secondary force transferring member which forms a fluid-tight perimeter therein.

6. The apparatus of claim 5, wherein said dual wheel-and-axle assembly is attached to the bottom of said primary chamber and contains a primary cable having an end attached to said primary force transferring member and its other end wrapped around a first wheel of said wheel-and-axle assembly, and said secondary cable having and end attached to said secondary force transferring member with its other end wrapped around a second wheel of said wheel-and-axle assembly and said cables are wrapped in opposite directions and the ratio of the axes of said first and second wheels is equal to the ratio of the cross-sectional area of said primary and secondary force transferring members.

7. The apparatus of claim 6, wherein said accumulation chamber has a pyramidal configured bottom with a flattened apex containing said inlet opening wherein said pyramidal bottom restricts the downward travel of said rigid float to allow an initial accumulation of seeped water to effect an initial buoyant force that will overcome the weight of said rigid float at rest.

8. The apparatus of claim 7, wherein the top of said accumulation chamber is open to the atmosphere to allow the self-leveling action of said storage tank water to cause said initial accumulation of said seeped water, for the purpose of inducing an imbalance of said restoring force over said weight forces, to reinforce said seepage in an upward direction.

* * * * *